United States Patent Office 2,749,149
Patented June 5, 1956

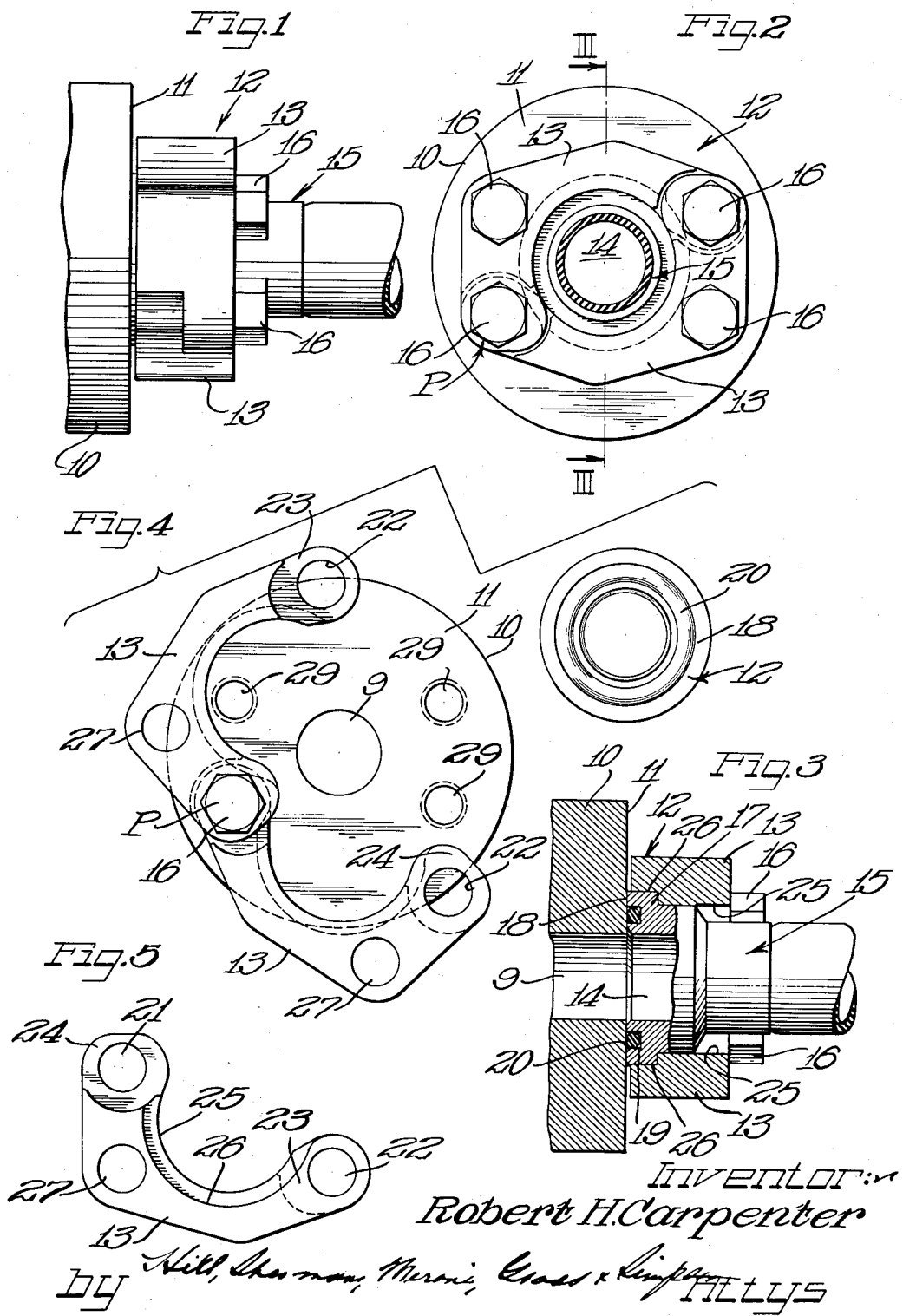

1

2,749,149

HINGE TYPE COUPLING FLANGE

Robert H. Carpenter, Dearborn, Mich., assignor to Meridan Corporation, Detroit, Mich., a corporation of Rhode Island Application June 15, 1951, Serial No. 231,868

6 Claims. (Cl. 285—30)

This invention relates broadly to couplings and more particularly to what I term a hinge type coupling flange.

An object of this invention is to provide a coupling device which permits the rapid connection and disconnection of tubing to the face of a member having an opening to be aligned with the bore of the tubing without the necessity of the tubing having to carry the connecting device.

Another object of the invention is to provide a coupling device for clamping the shouldered end of tubing in alignment with a hole in a member which device can be quickly connected to or disconnected from the tubing without requiring its disconnection from the member.

Yet another object of this invention is to provide a coupling device for detachably securing tubing to a member which device includes a minimum of parts and lends itself to economical manufacture.

A still further object of the invention is to provide a coupling device or flange for detachably securing the shouldered end of tubing in alignment with a hole in a fixed member and which device requires a minimum amount of installation time and is of such construction that the likelihood of the parts of the device being misplaced when disconnected from the tubing is reduced to a minimum.

In accordance with the general features of the present invention there is provided in a heavy duty fluid coupling assembly including a member having a mounting face with a fluid passage opening therein and a tubular element for fluid passage registration with said opening having an enlarged annular flange seating against said mounting face with a compressible fluid seal therebetween and with a shoulder on said flange facing away from said mounting face in spaced relation thereto, a coupling device for securing said tubular element removably to said mounting face and comprising coupling arms each engaging about a segmental portion of the tubular element to collectively completely encircle the tubular element, said arms each having an inset rabbet groove within which said flange of the tubular member is engaged and provided with a hold-down shoulder bearing clampingly against said flange, each of said coupling arms being of substantially uniform thickness throughout its length and having substantially flat end faces with the exception of having at one terminus a bolt eye of reduced thickness inset from one face of the arm approximately half the thickness of the arm and disposed flush with the opposite face of the arm and at the opposite terminus a bolt eye inset from the opposite face approximately half the thickness of the arm and disposed flush with said one face, the respective bolt eyes of the arms being in complementary relation and overlapping, and respective bolts extending through the overlapping bolt eyes and secured in holes in said member, said arms between said eyes being substantially thicker than said flange and the holddown shoulders of said rabbet grooves being spaced in each instance from the member-opposing face of the respective coupling arms slightly less than the thickness of said flange so

2 that the tubular element will be drawn tightly against said mounting face and to place the compressible seal under sealing compression as an incident to tightening the bolts and if said bolt eyes tend to be deflected toward said mounting face they will engage the mounting face as a stop against over-deflection of said eyes, said bolt eyes being respectively closely spaced at their ends from the adjacent inset arm portions continguous the companion eye and being thereby pivotally relatively related so that when one of the bolts is removed the coupling arms can be swung pivotally about the axis of the bolt at the opposite ends of the arms, said eyes having their peripheral portions rounded off to a respective radius substantially concentric with the respective axis of the bolt holes therein to clear freely the adjacent opposing surface of said tubular element in said pivotal swinging of the arms for insertion or removal of said tubular element while the coupling arms are retained on said member by said bolt at the opposite ends of the arms.

It is another feature of the invention to provide in such a coupling assembly respective supplementary bolts extending through apertures in the coupling arms spaced substantially from respective termini of the arms that have outwardly facing inset eyes and disposed closely adjacent to the inwardly facing inset eyes at the adjacent termini of the arms and with such supplementary bolts adapted to be secured in bores in the member to which the arms are attached and whereby such supplementary bolts hold the arms against pressure warpage, said arms in the areas thereof adjacent to the supplementary bolt apertures being preferably enlarged laterally while the remaining and major extents of the arms are of a substantially narrower width to minimize the lateral space within which the arms may be accommodated.

Other objects and features of this invention will more fully appear from the following detailed description taken in connection with the accompanying drawings which illustrate a single embodiment thereof and in which:

Figure 1 is a fragmentary elevation showing my coupling device or flange holding a tube on the face of the member;

Figure 2 is an end view of the structure shown in Figure 1 with the tubing shown in section;

Figure 3 is a fragmentary cross-sectional view taken on the line III—III of Figure 2 looking in the direction indicated by the arrows;

Figure 4 is a disassembled or exploded view showing the pivotal arms of the coupling flange separated from the tubing end removed therefrom; and Figure 5 is a detail view showing one of the pivotal arms of my coupling device or flange.

As shown on the drawing:

The reference character 10 designates generally a member having a hole or opening 9 (Figs. 3 and 4) through which fluid, either gas or liquid, passes. This member has a flat face 11 at right angles to the hole 9 to which my novel coupling device or flange 12 is adapted to be fastened for connecting tubing in alignment with the hole 9 (Fig. 3).

At this time it should be well to note that my coupling arrangement may be used on any type of industrial equipment such as earth moving apparatus, vehicles, refrigeration apparatus, etc. It can also be used on aircraft jet engines, submarines, ships and various other types of defense equipment. In reality it may be used any place where a flat member or flange has a hole to be connected with the bore of tubing.

The coupling device 12 includes opposite pivotal arms 13—13 which are identical and, hence, interchangeable. In use one arm is reversed in position with reference to the other on the face 11 of member 10. Any suitable conventional fastening means such as cap screws or bolts 16 are employed for attaching the arms to the face 11 of member 10 around an enlarged or shouldered end 17 (Fig. 3) of tubing 15. The tubing may be of any suitable construction as long as the same is provided with a shouldered end 17 with an end surface 18 for flush engagement with the face 11 of member 10. This end surface or face 18 may be provided with a groove 19 in which is disposed a conventional resilient or rubber-like O ring for sealing engagement with the face 11, although any suitable sealing means could be employed.

Each of the arms 13, as best shown in Figure 5, comprises a curved or arcuate element having its opposite ends apertured at 21—22 and also having its opposite ends recessed or cut away to provide flange ends or bolt eyes 23 and 24. These cut away flange ends 23 and 24 face in opposite directions for overlapping engagement with the corresponding flange ends 23 and 24 of the other arm. Actually, the cut away flange ends 23 and 24 are each approximately one-half the thickness of the thickness of the arm 13. In addition, when the cut away flange ends 23 and 24 of the arms are engaged with each other as shown in Figure 2, the hole or aperture 21 of each arm is aligned with the corresponding aperture in the other arm for receiving the shank of one of the bolts at P (Fig. 4) which serves as a hinge pin for the arms.

Similarly, the apertures 22 in the free ends of the arms are aligned with each other when the flange ends 23—24 are engaged in overlapping relationship.

It will also be noted (Fig. 5) that each arm, at 25, defines one-half of a circular opening for receiving the end of tubing 15. The semi-circular portion 25 is shouldered or cut away at 26 to provide an enlargement in the opening adjacent face 11 of member 10 (Fig. 3) for housing the enlarged or shouldered end 17 of tubing 15. It will be observed (Figs. 1 and 3) the cut away rabbet groove 26 is inset with a hold-down shoulder that engages the flange 17 and is spaced from the inner face of the coupling arm that opposes the member face 11 to a spacing slightly less than the thickness of the flange 17 so that the flange 17 and thereby the member 15 will be drawn tightly against the mounting face 11 to place the compressible seal 20 under sealing compression as an incident to tightening the bolts 16, and if the bolt eyes 23, 24 tend to be deflected toward the mounting face 11 they will engage the mounting face as a stop against over-deflection of the eyes.

The curved edge portion 25 of each arm is symmetrically arranged about a plane passing through the axis of hinge screw P and the axis of one of the other bolt elements 16 cooperating with the free end of the arm.

This construction is such that when the arms are loosely hinged to member 10 by pin or screw 16, threaded into member 10 at P as shown in Fig. 4, they will receive between them shouldered end 17 of the tubing. Upon the closing of the arms around the tubing (Figs. 2 and 3) the shouldered tubing end 17 is locked against the shouldered portions 26 of the arms and against axial displacement. Thereafter the other screws 16 are inserted in the aligned holes 22—22 of the arms 13 and in holes 27—27 of the arms as well as into holes 29 in the member 10 (Fig. 4). By tightening all of the screws or bolts 16 the arms of the device 12 are tightly clamped together about the shouldered end 17 of tubing 15 and to the member 10 with the tubing bore aligned with hole 9 in member 10. Also the sealing ring 20 is compressed into tight sealing engagement between member 10 and device 12 around the bore of tubing 15.

It is clear that no part of the coupling device 12 is carried by the tubing and that not only may the tubing be quickly disconnected from member 10 by removing the bolts but likewise the clamping arms 13 may be easily and quickly removed, if desired, from member 10. However, it is not necessary to detach the arms from member 10 in order to remove the tubing since by merely loosening the hinge bolt at P the arms upon removal of the other screws or bolts 16 can be swung out of the way as shown in Fig. 4.

The bolt eyes 23, 24 have their peripheral portions rounded off to a respective radius substantially concentric with the respective axis of the bolt holes therein to clear freely the adjacent opposing surface of the tubular element 15 in the pivotal swinging of the arms for insertion or removal of the tubular element while the coupling arms are retained on the member 10 by the bolt 16 at the opposite ends of the arms.

It will also be observed that throughout their major extent, at least, the arms 13 are of substantially greater thickness than width so as to give them great resistance to compression when the bolts are tightened.

It will be understood that modifications and variations may be effected without departing from the scope of the novel concepts of the present invention.

I claim as my invention:

1. In combination, a member having a mounting face with an opening therein, a tubular element having an enlarged end portion with a bore aligned with the opening in said mounting face, said enlarged tubular end portion having an end face disposed against said mounting face and having an oppositely directed shoulder spaced from said end face, a coupling device securing said tubular element to said mounting face and comprising a pair of coupling arms having overlapping end portions and together encircling said element, said arms having internal shoulders engaging the shoulder of the enlarged tubular end portion and having flange portions extending in teelscoping relation to said enlarged tubular end portion, but of axial extent less than the axial extent of said enlarged tubular end portion to terminate in spaced relation to said mounting face, and fastening means holding the overlapping end portions of the coupling arms together and drawing the coupling device toward said mounting face, said spaced relation assuring unhampered thrust of said coupling device against said end portion shoulder for tightly clamping the enlarged tubular end portion to said mounting face.

2. In combination, a member having a mounting face with an opening therein, a tubular element having an enlarged end portion with a bore aligned with the opening in said mounting face, said enlarged tubular end portion having an end face disposed against said mounting face and having an oppositely directed shoulder spaced from said end face, a coupling device securing said tubular end portion to said mounting face and comprising a pair of coupling arms having overlapping end portions and together encircling said element, said mounting face having a pair of holes on each of diametrically opposite sides of the opening therein, said coupling arms being of generally L-shape and each having apertures in the opposite end portions and at the crook thereof disposed to register respectively with three of the holes in said mounting face, said arms having internal shoulders engaging the shoulder of the enlarged tubular end portion and having flange portions extending in telescoping relation to said enlarged tubular end portion, but of axial extent less than the axial extent of said tubular end portion to terminate in spaced relation to said mounting face, fastening elements extending through the apertures in the overlapping end portions of the coupling arms and into two of the holes in said mounting face, and further fastening elements extending through the respective apertures at the crooks of the L-shaped arms and into the respective aligned holes in the mounting face, whereby the enlarged tubular end portion is tightly clamped to the mounting face, but with the coupling arms spaced from the mounting face for maximum clamping action on the tubular end portion.

3. In a heavy duty fluid coupling assembly including a member having a mounting face with a fluid passage opening therein and a tubular element for fluid passage registration with said opening having an enlarged annular flange seating against said mounting face with a compressible fluid seal therebetween and with a shoulder on said flange facing away from said mounting face in spaced relation thereto, a coupling device for securing said tubular element removably to said mounting face and comprising coupling arms each engaging about a segmental portion of the tubular element to collectively completely encircle the tubular element, said arms each having an inset rabbet groove within which said flange of the tubular member is engaged and provided with a hold-down shoulder bearing clampingly against said flange, each of said coupling arms being of substantially uniform thickness throughout its length and having substantially flat end faces with the exception of having at one terminus a bolt eye of reduced thickness inset from one face of the arm approximately half the thickness of the arm and disposed flush with the opposite face of the arm and at the opposite terminus a bolt eye inset from the opposite face approximately half the thickness of the arm and disposed flush with said one face, the respective bolt eyes of the arms being in complementary relation and overlapping, and respective bolts extending through the overlapping bolt eyes and secured in holes in said member, said arms between said eyes being substantially thicker than said flange and the hold-down shoulders of said rabbet grooves being spaced in each instance from the member-opposing face of the respective coupling arms slightly less than the thickness of said flange so that the tubular element will be drawn tightly against said mounting face and to place the compressible seal under sealing compression as an incident to tightening the bolts and if said bolt eyes tend to be deflected toward said mounting face they will engage the mounting face as a stop against over-deflection of said eyes, said bolt eyes being respectively closely spaced at their ends from the adjacent inset arm portions contiguous the companion eye and being thereby pivotally relatively related so that when one of the bolts is removed the coupling arms can be swung pivotally about the axis of the bolt at the opposite ends of the arms, said eyes having their peripheral portions rounded off to a respective radius substantially concentric with the respective axis of the bolt holes therein to clear freely the adjacent opposing surface of said tubular element in said pivotal swinging of the arms for insertion or removal of said tubular element while the coupling arms are retained on said member by said bolt at the opposite ends of the arms.

4. A coupling assembly as defined in claim 3 including in addition respective supplementary bolts extending through apertures in said arms spaced substantially from the respective termini thereof having the outwardly facing inset eyes and disposed closely adjacent to the inwardly facing inset eyes and secured in bores in said member so as to hold the arms against pressure warpage.

5. A coupling assembly as defined in claim 4 wherein said arms have lateral enlargements on the portions thereof through which said supplementary bolt apertures extend therethrough while the portions of the arms between said apertures and the termini of the arms having the outwardly facing inset eyes are substantially narrower to minimize the clearance space required for accommodating the arms in the assembly.

6. A coupling assembly as defined in claim 3 wherein the thickness of the arms is substantially greater than the width of the arms throughout the major extent of the arms.

References Cited in the file of this patent

UNITED STATES PATENTS

| | | |
|---|---|---|
| 335,592 | Keyworth | Feb. 9, 1886 |
| 432,318 | Mathews et al. | July 15, 1890 |
| 1,809,313 | Root | June 9, 1931 |
| 2,376,134 | Frank | May 15, 1945 |
| 2,413,878 | Maky | Jan. 7, 1947 |
| 2,422,597 | Stewart | June 17, 1947 |
| 2,681,817 | Demlow | June 22, 1954 |